United States Patent [19]

Mueller et al.

[11] Patent Number: 4,813,591

[45] Date of Patent: Mar. 21, 1989

[54] METHOD OF FABRICATING A REAR FORK ASSEMBLY FOR A BICYCLE AND DROP OUT BRACKET THEREFOR

[75] Inventors: Clifford F. Mueller, Arlington Heights; George Herzovi, Chicago, both of Ill.

[73] Assignee: Schwinn Bicycle Company, Chicago, Ill.

[21] Appl. No.: 177,047

[22] Filed: Apr. 4, 1988

[51] Int. Cl.[4] .................... B62K 19/20; B23K 33/00
[52] U.S. Cl. .................... 228/173.4; 228/182; 280/288; 280/288.3; 285/286; 285/287; D12/111
[58] Field of Search ............... 228/173.4, 182; 29/237, 29/282, 425; 285/21, 286, 287, 331; D12/110–112; 280/281 R, 288

[56] References Cited

U.S. PATENT DOCUMENTS

| | | | |
|---|---|---|---|
| D. 243,598 | 3/1977 | Davidson | D12/111 |
| 585,176 | 6/1897 | Bennett | 280/288 |
| 589,498 | 9/1897 | Dicks | 280/288 |
| 622,006 | 3/1899 | Jerome | 280/288 |
| 1,517,238 | 11/1924 | Stresau | 280/800 |
| 2,194,272 | 3/1940 | Blu | 285/286 |
| 2,435,448 | 2/1948 | Kraeft et al. | 285/286 |
| 3,396,813 | 8/1968 | Hall | 228/173.4 |
| 4,081,189 | 3/1978 | Dumas | 285/286 |
| 4,723,786 | 2/1988 | Buchanan | 280/281 R |
| 4,728,113 | 3/1988 | Thun, Jr. | 228/173.4 |

FOREIGN PATENT DOCUMENTS

| | | | |
|---|---|---|---|
| 925325 | 3/1955 | Fed. Rep. of Germany | 285/286 |
| 1316 | 1/1978 | Japan | 285/286 |

*Primary Examiner*—Nicholas P. Godici
*Assistant Examiner*—Samuel M. Heinrich
*Attorney, Agent, or Firm*—McCaleb, Lucas & Brugman

[57] ABSTRACT

A method for fabricating a rear fork assembly for a bycycle includes the steps of: (1) making seat stay tubes and chain stay tubes and drop outs as separate components with universally pivotable, abuttable joints between the stay tubes and mating portions of the drop outs; (b) clamping these components at a predetermined angular relationship; and (c) welding the joints to fix them in that predetermined angular relationship. In one embodiment, the joints are ball and socket type and the seat stay tubes are connected to the seat tube through an inverted U-shaped yoke and a straight yoke tube with modified ball and socket type joints at the top and bottom of the yoke. In another embodiment, the seat stay tubes are connected directly between the drop outs and the yoke tube. One embodiment has convex or ball-shaped surfaces on the drop outs engageable with annular or concave curved end surfaces on the seat stay tubes; another has concave, curved portions on the drop outs engageable with convex or ball-shaped ends on the stay tubes.

15 Claims, 7 Drawing Sheets

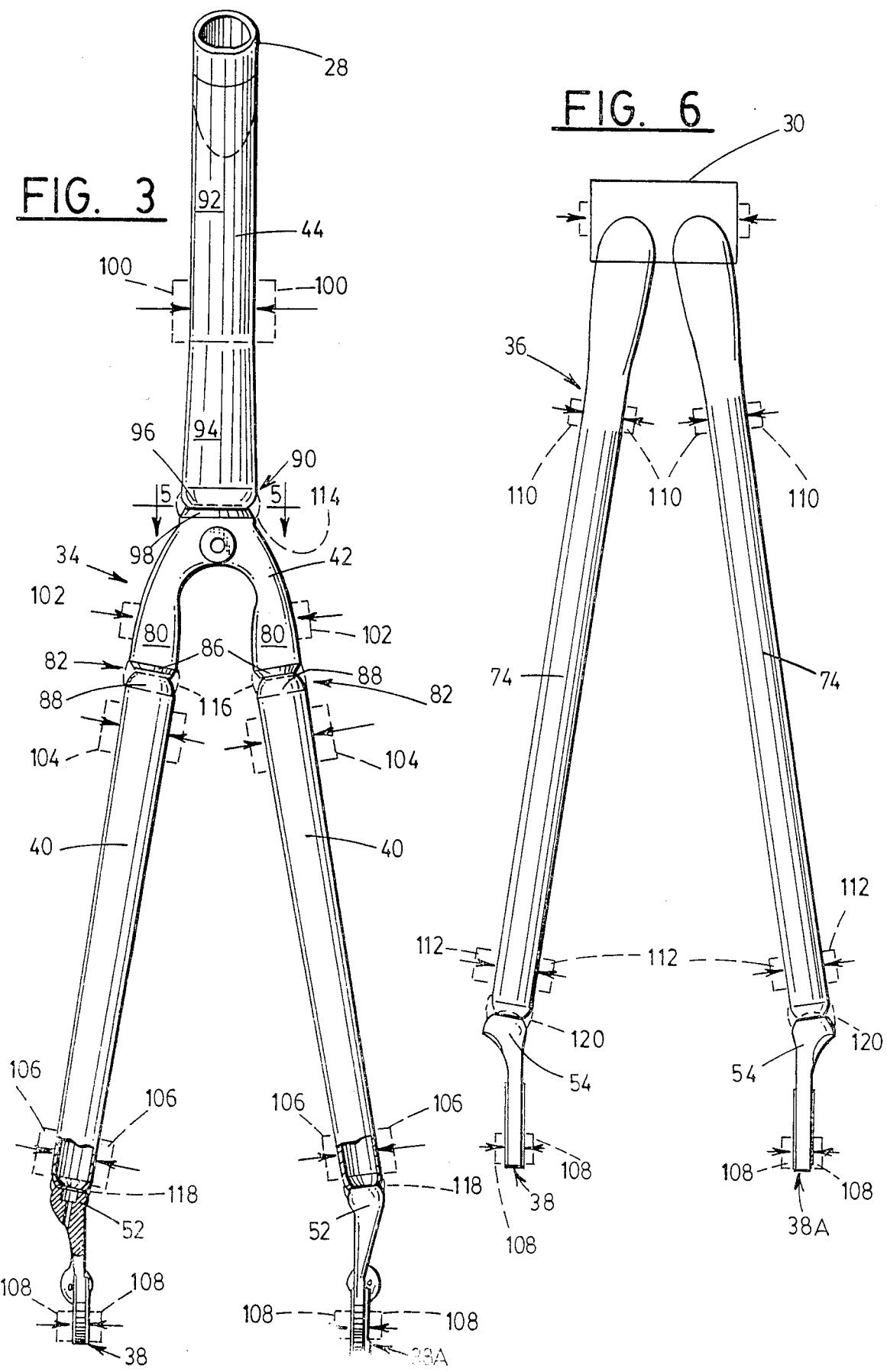

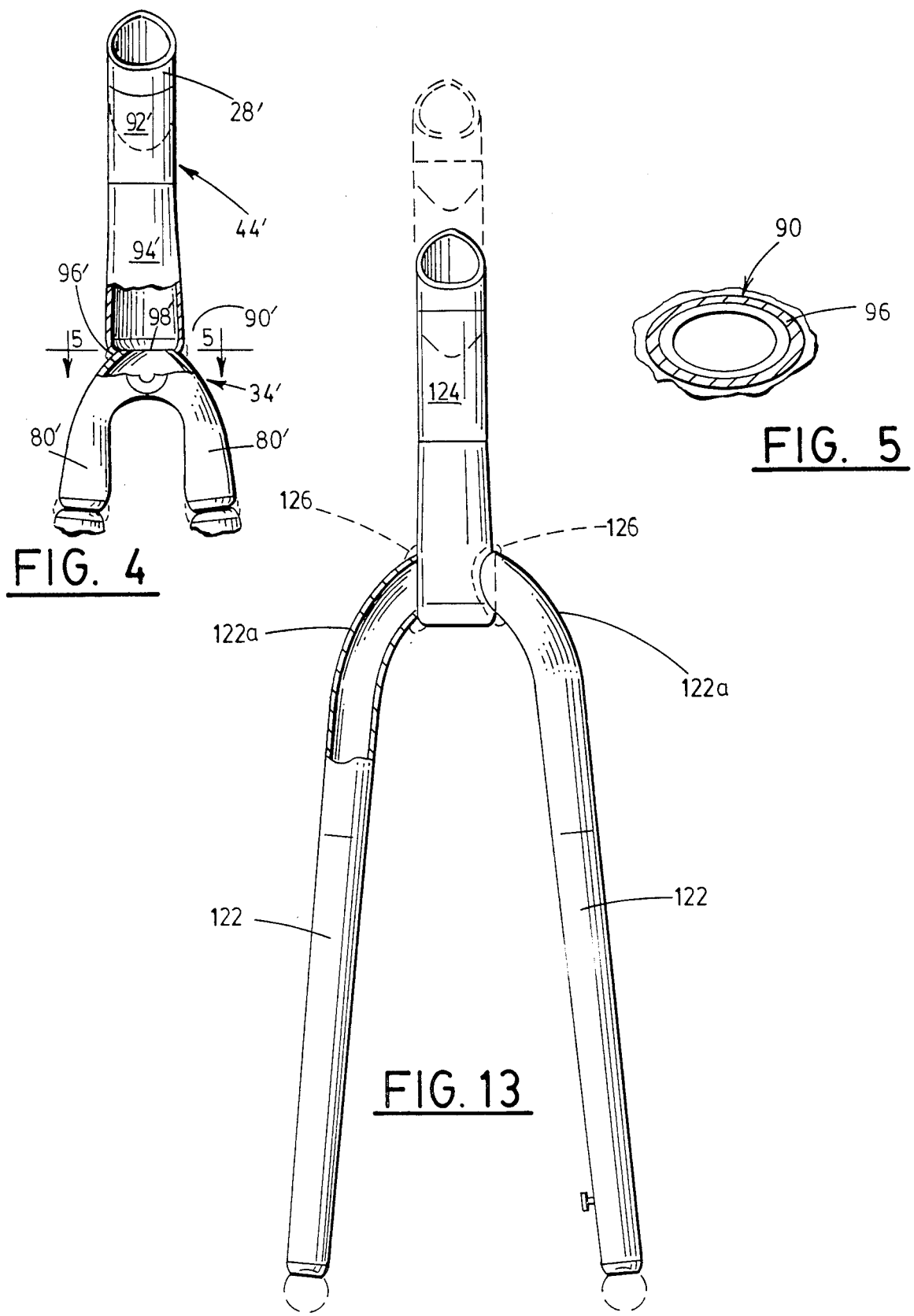

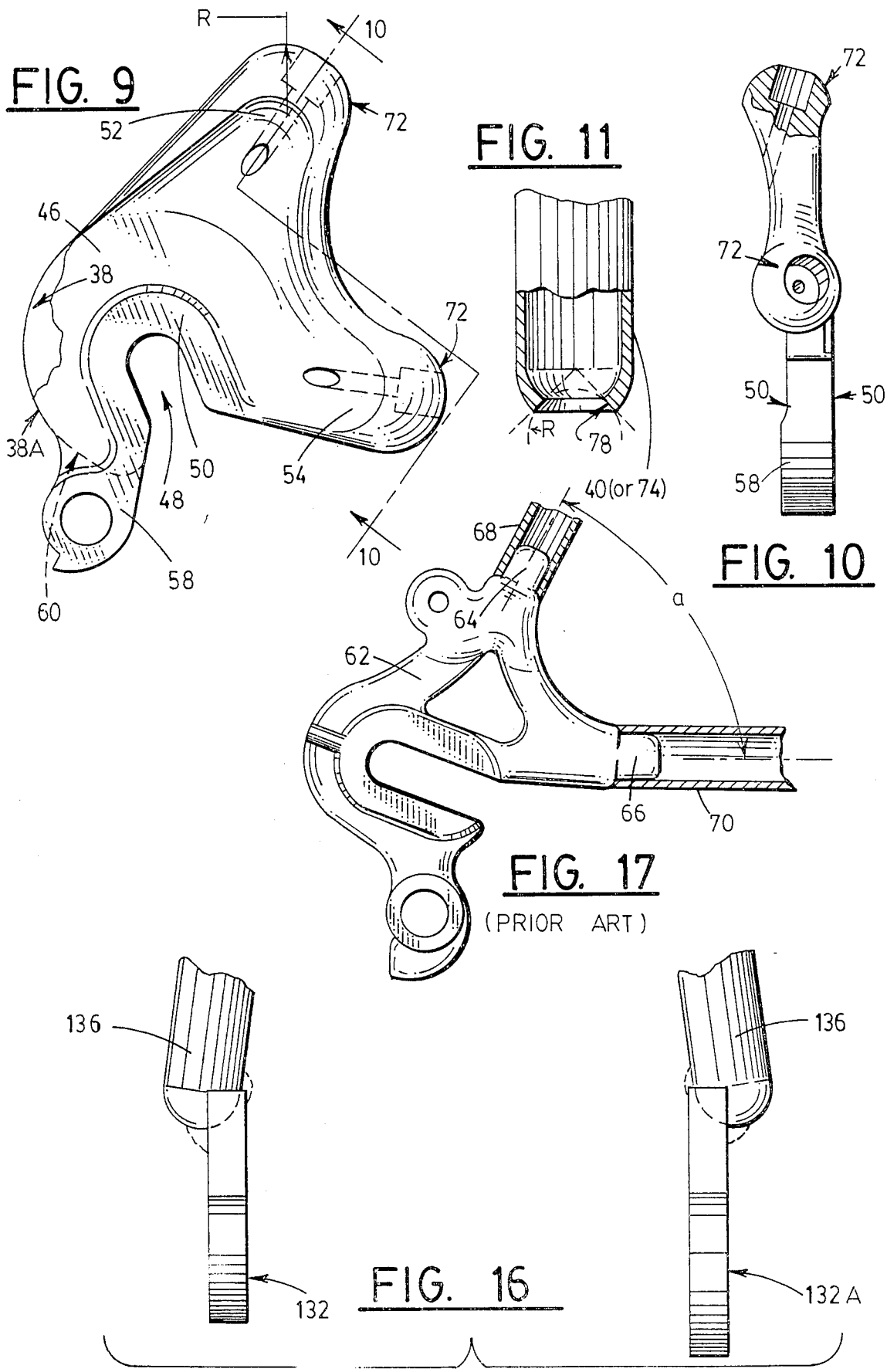

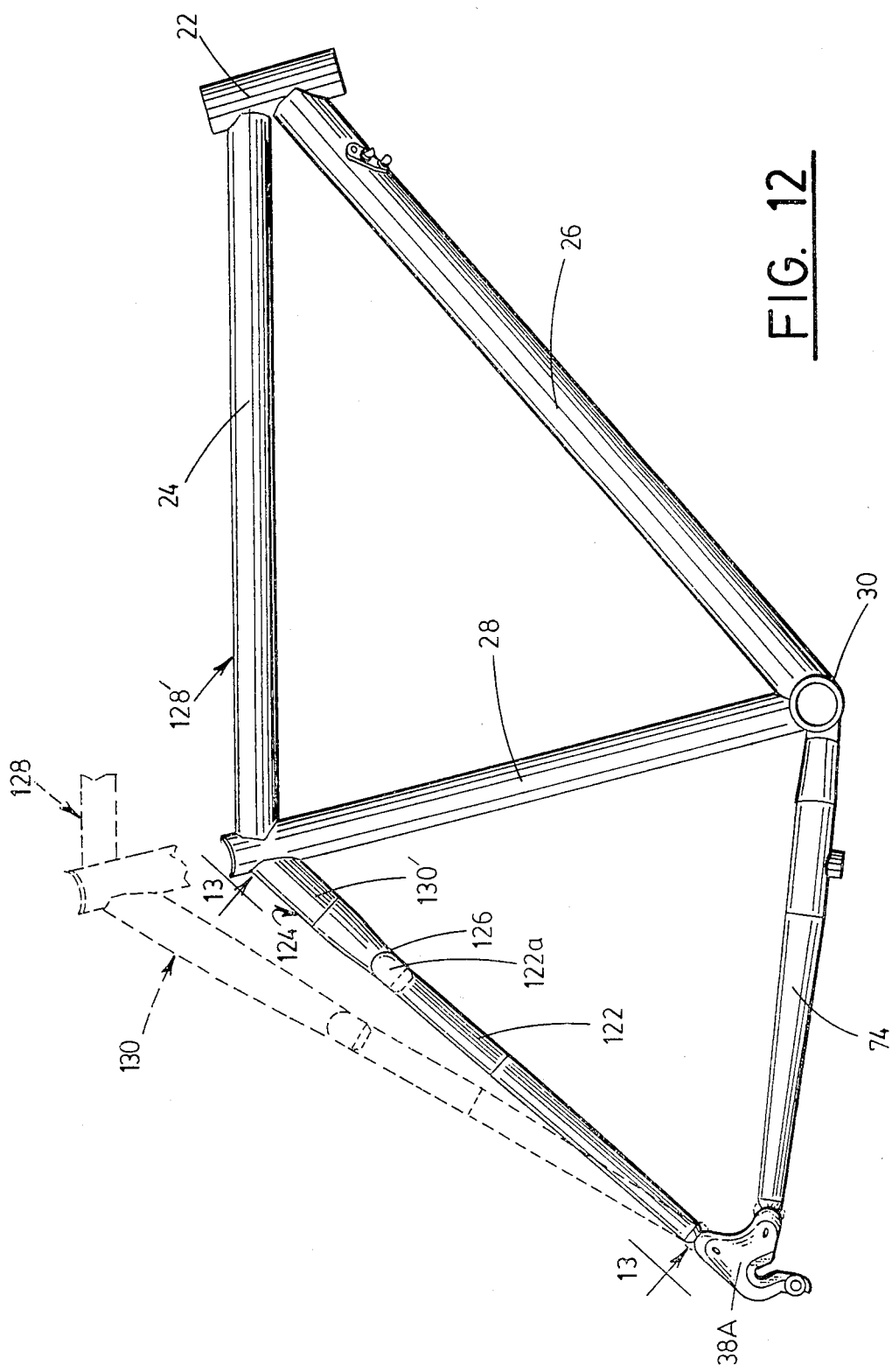

METHOD OF FABRICATING A REAR FORK ASSEMBLY FOR A BICYCLE AND DROP OUT BRACKET THEREFOR

BACKGROUND OF THE INVENTION

The present invention relates generally to the manufacture of bicycles having a frame of the well known "diamond" configuration. These are made of light weight tubing and have wheel bearing brackets or drop outs at the rear and front forks. At the rear wheel, the drop outs connect the rear fork assembly to the rear axle. At the front wheel, they connect the front fork assembly to the front axle.

In high quality bicycles there is an emphasis on light weight to improve pedaling response, and on frame rigidity to improve pedaling ease and avoid inefficient deflection of the frame at each pedal stroke.

The drop outs are critically important components because they tie the frame together at the ends which directly receive road shocks. To provide the strength and the light weight required, many have been manufactured by conventional hot forging techniques which require costly tools and dies, lavish amounts of expensive mechanical and thermal energy, and substantial investment in heavy machinery and highly skilled labor. Grinding and chrome-plating opposite faces have added further to the cost.

More recently, attempts have been made to reduce this cost by laminating die-cut stainless steel face plates on opposite sides of a base plate punchment, using an electric press-welding technique, as described in U.S. Pat. No. 4,524,989 issued June 25, 1985, to Norman L. Centeny on "Laminated Reinforced Fork End Fitment Connector For A Bicycle And Process For Manufacturing Same".

In spite of the cost savings in such new manufacturing methods, there is another area of substantial expense which has been completely overlooked: the necessity of building, and stocking, a special rear wheel drop out bracket for each and every size of bicycle frame.

In the rear fork assembly of the above mentioned diamond configuration frame, the drop out brackets have pairs of forwardly and upwardly extending, angularly offset extension lugs which fit telescopically within and are welded or brazed to the ends of the seat stay and chain stay tubes.

A full line of bicycles between the 25-inch and 19-inch frames may require as many as seven different drop outs, each with their above-mentioned extension lugs angularly offset both laterally and longitudinally to match the angles of the seat stay and chain stay tubes.

To build and maintain the tooling and production machinery for seven different size drop outs, and to keep all seven sizes in stock, are substantial and unnecessary expenses which are eliminated by the present invention.

SUMMARY OF THE INVENTION

It is therefore a principal object of the present invention to provide a method of fabricating a rear fork assembly for a bicycle frame utilizing a single size drop out bracket for a plurality of different size bicycle frames, without requiring a different drop out bracket for each different size frame, thereby obtaining substantial cost reductions over conventional practice while providing a bicycle frame which is as rigid and light in weight, and as attractive, as conventional rear fork assemblies.

In particular, it is an object of the present invention to provide an improved method of fabricating a rear fork assembly for a bicycle of the so-called "diamond" configuration frame, this improved method comprising the steps of:

(a) making seat stay and chain stay tubes and rear drop out brackets as separate components with universally pivotable, abuttable joints between the ends of the tubes and mating portions of the drop out brackets;

(b) clamping the tubes and drop out brackets at predetermined angular relationships; and (c) welding the tubes to the drop out brackets to fix the joints in those predetermined angular relationships; whereby a single size drop out bracket may be used in making a plurality of sizes of bicycle frames by selectively varying those predetermined angular relationships for each different size frame.

Another object is to provide the universally pivotably abuttable joints in the form of ball and socket joints.

Another object is to provide the ball and socket joints with a ball portion on the drop out bracket and a socket portion on the end of each corresponding seat stay and chain stay tube.

Another object is to provide socket portions on the ends of the seat stay and chain stay tubes as annular-shaped surfaces contoured to fit corresponding ball-shaped surfaces on the drop out brackets.

Another object is to provide annular-shaped surfaces on the ends of the seat stay and chain stay tubes spherically concave to fit corresponding ball-shaped surfaces on the drop out brackets.

Another object is to provide an improved method of fabricating seat stay and chain stay tube subassemblies for a rear fork assembly of a bicycle frame including the steps of:

(a) making an inverted U-shaped yoke having a pair of downwardly extending arms, and making a yoke tube, both said yoke and yoke tube initially being components separate from the seat stay tubes and drop out brackets;

(b) providing articulated joints between each downwardly extending yoke arm and the top end of a corresponding seat stay tube;

(c) providing an articulated joint between the top end of the yoke and the bottom end of the yoke tube;

(d) clamping the joints to hold the yoke tube and seat stay tubes in predetermined angular relationship; and (e) welding the yoke to the seat stay tubes and to the yoke tube at those joints while so clamped to fix the stated predetermined angular relationship;

whereby same-size yoke and seat stay tubes may be used to make a plurality of sizes of bicycle frames while varying only the length of the yoke tube.

Another object of the present invention is to provide an improved rear fork assembly including pairs of seat stay and chain stay tubes extending in angularly-offset relationship from a pair of rear drop out brackets having angularly-offset peripheral portions connected to the respective seat and chain stay tubes by means of joints which are initially universally pivotable and are subsequently fixed by welding in the stated angularly-offset relationship.

Another object is to provide such an improved rear fork assembly in which the initially universally pivotable joints are of the ball and socket type.

Another object is to provide such an improved rear fork assembly in which the angularly-offset peripheral portions on the drop out brackets have external curved surfaces adapted to be connected by welding to the seat stay and chain stay tubes at different angular orientations.

Another object is to provide such an improved rear fork assembly in which the external curved surfaces are externally convex.

Another object is to provide such an improved rear fork assembly in which the external curved surfaces are ball-shaped.

Another object is to provide such an improved rear fork assembly in which the external curved surfaces are externally concave and adapted to fit externally convex end surfaces on the stay tubes prior to welding.

BRIEF DESCRIPTION OF THE DRAWINGS

Other objects and advantages will be apparent from the following description taken in connection with the drawings in which:

FIG. 3 is a rear view of FIG. 1 taken in the direction of arrows 3—3;

FIG. 4 is a rear view of FIG. 2 taken in the direction of arrows 4—4 and partially sectioned to show details of a welded joint;

FIG. 5 is a cross-sectional view taken along line 5—5 of either FIG. 3 or 4;

FIG. 6 is a bottom view of FIG. 1 taken in the direction of arrows 6—6;

FIG. 9 is an enlarged side view of one of the drop outs shown in the previous figures;

FIG. 10 is a partially sectioned front view of FIG. 9, taken along line 10—10;

FIG. 11 is an enlarged, partly-sectioned rear end view of one of the seat tubes or one of the chain stay tubes;

FIG. 12 is a fragmentary side view of another bicycle frame showing an alternative rear fork arrangement employing the present invention;

FIG. 13 is a rear view taken in the direction of arrows 13—13 of FIG. 12;

FIG. 16 is a bottom view of FIG. 14, taken in the direction of arrows 16—16; and FIG. 17 is a side view of a conventional rear drop out bracket and seat stay and chain stay tubes showing the prior art.

Like parts are designated by like reference numerals throughout the figures.

DESCRIPTION OF THE PREFERRED EMBODIMENTS

Figure 1:
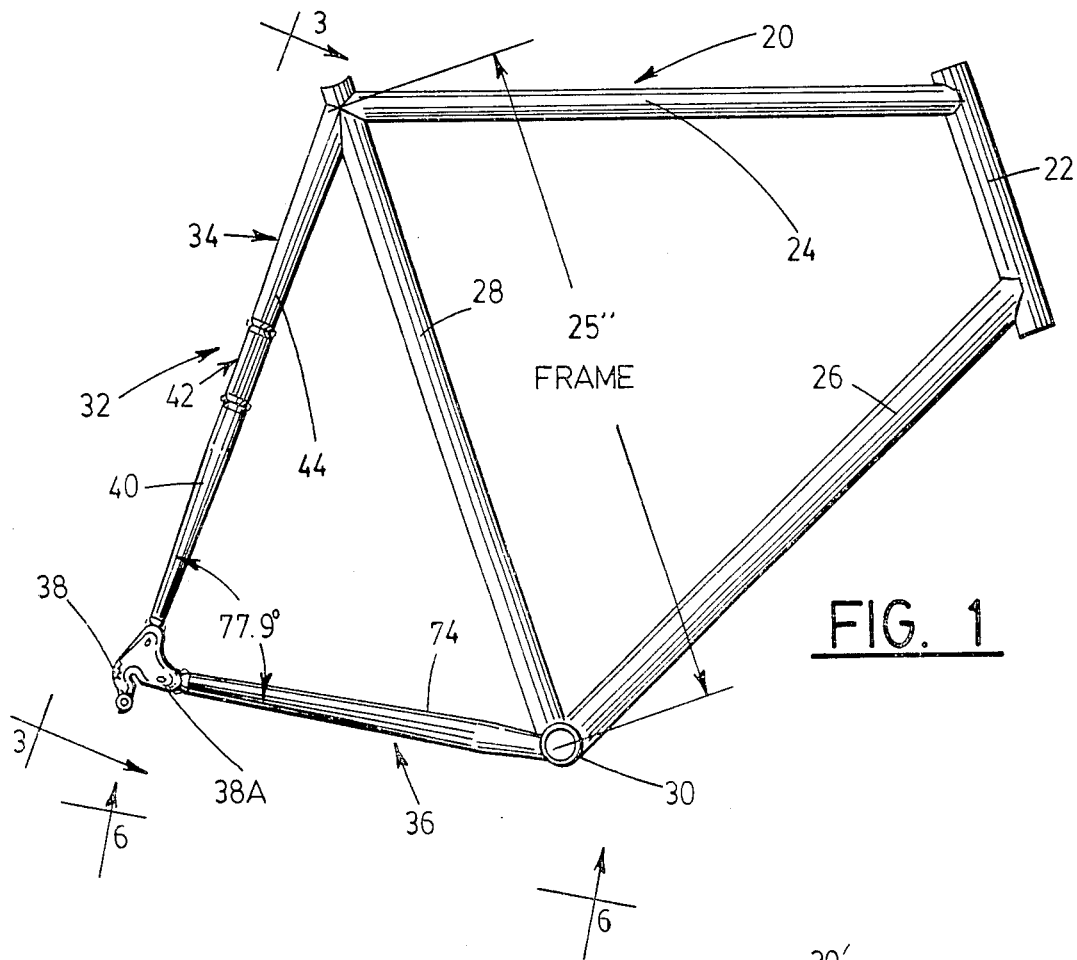
FIG. 1 is a right side view of a bicycle frame illustrating rear wheel bearing brackets commonly called "drop outs" which incorporate a form of the present invention.
Figure 2:
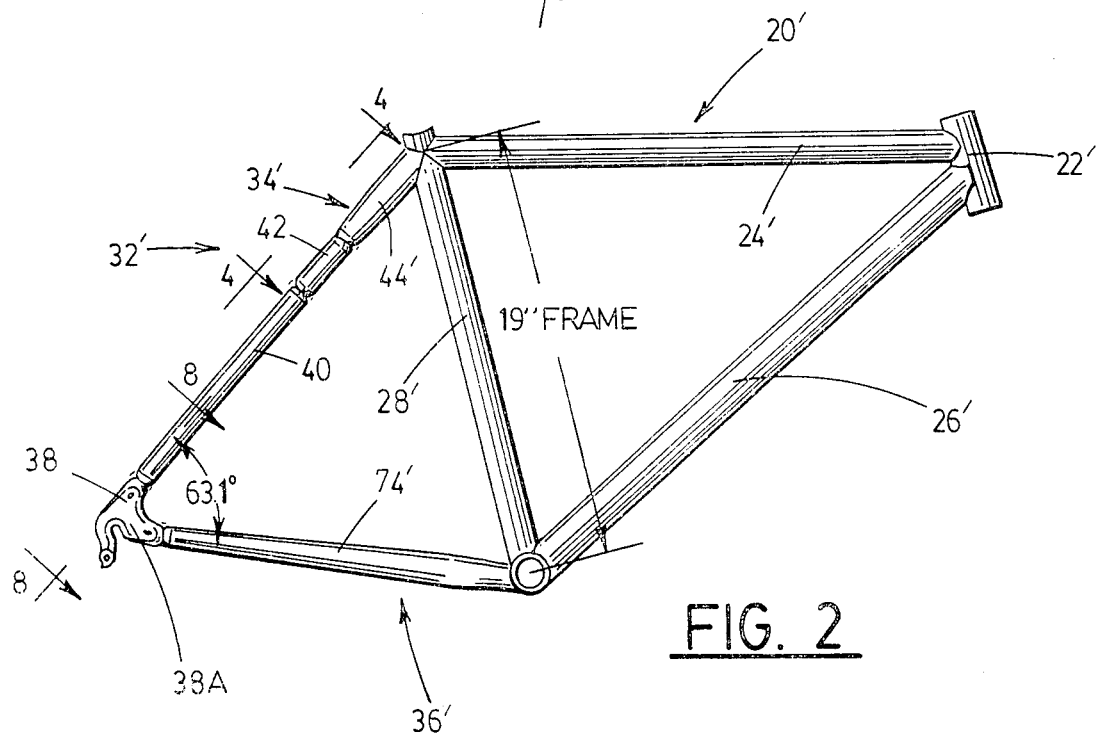
FIG. 2 is a view similar to FIG. 1 but showing the same drop outs on a much smaller bicycle frame.

Referring now more particularly to the specific embodiments of the invention shown in the drawings, FIGS. 1 and 2 show the improved rear fork assembly applied to two different sizes of the "diamond" configuration bicycle frame. FIG. 17 is an example of a prior art drop out with corresponding seat stay and chain stay tubes.

FIG. 1 illustrates a 25" frame 20 having a head tube 22, a top tube 24 and a down tube 26 extending rearwardly and downwardly from the head tube, and a seat tube 28 connected between the top tube and a bottom bracket or pedal housing 30 which in turn is connected to the down tube. A rear fork assembly generally designated 32 comprises a seat stay subassembly 34, a chain stay subassembly 36, and a pair of rear drop out brackets ("drop outs") 38 and 38A.

FIG. 2 illustrates a frame 20' comparable to FIG. 1 except that it is a substantially smaller size, namely 19". It will be understood that frames 20 and 20' have similar structural features except that the 19" frame is indicated by corresponding reference numerals having a prime suffix (see FIGS. 2 and 4).

As shown in FIGS. 3 and 5-11, the seat stay subassembly 34 for the 25" frame comprises the pair of drop outs 38 and 38A, a pair of seat stay tubes 40,40, an inverted U-shaped yoke 42, and a straight yoke tube 44.

Referring to FIGS. 9 and 10, each of the drop outs 38 and 38A comprises a generally flat body 46 having an open-ended slot 48 to receive one end of a rear wheel axle (not shown). The body has a pair of opposite, generally planar, slightly raised, parallel, external surfaces 50 around the slot periphery. Each drop out will be connected by welding to a corresponding seat stay tube 40 and chain stay tube 74, respectively. In addition, the right hand drop out 38A has a mounting arm 58 for mounting a derailleur (not shown) in the usual way. For comparison the left hand drop out 38 terminates along a broken line 60 shown in FIG. 9.

Any particular style of bicycle may be offered in a plurality of individual frame sizes, for different users. The frame style shown in FIGS. 1 and 2 is available in seven sizes in 1" increments from the 25" size shown in FIG. 1 to the 19" size shown in FIG. 2.

Referring to the prior art drop out shown in FIG. 17, it has a generally flat body 62 with a pair of peripheral extensions 64 and 66 offset from one another at an angle "a" which exactly matches the angle subtended by a seat stay tube 68 and a chain stay tube 70. Because the extensions 64 and 66 fit snugly within the ends of stay tubes 68, 70, it has heretofore been necessary to manufacture, and stock a special drop out pair for each different size bicycle frame, with the extensions 64 and 66 angularly offset at exactly the angle "a" for proper fit. For the bicycle style shown in FIGS. 1 and 2, the seven different sets of drop outs have required the angle "a" to vary from 63.1° to 77.9°. This is shown in FIGS. 1 and 2, and, again in FIG. 7.

An important feature of the present invention is that the same pair of drop outs 38 and 38A can be used for many different size bicycle frames. As will be described, the exact same pair may be used for the entire range of frame sizes from the 25" frame in FIG. 1 to the 19" frame in FIG. 2.

The method of fabricating the rear fork assembly and the details of the novel drop outs which make this possible will now be described.

Referring to the improved drop out 38, or 38A, shown in FIGS. 9 and 10, each angularly offset peripheral portion 52 and 54 has a partially spherical surface 72 generated about a radius R. This is part of a universally pivotable ball and socket joint which enables the drop out to be used with different size frames, regardless of variations in the included angle "a" between the seat stay and chain stay tubes 40, 74 (and 40' and 74').

The improved rear fork assembly 32 for the 25" frame comprises the seat stay subassembly 34 (FIGS. 1 and 3) and the chain stay subassembly 36 (FIGS. 1 and 6). Drop outs 38, 38A are common to the two subassemblies.

The seat stay subassembly 34 comprises the two drop outs 38, 38A, the pair of seat stay tubes 40,40, the inverted U-shaped yoke 42, and the yoke tube 44, all as shown in FIGS. 1 and 3.

The chain stay subassembly 36 comprises the two drop outs 38, 38A and a pair of chain stay tubes 74,74, as shown in FIGS. 1 and 6.

The seat stay tubes 40,40 are identical, straight, and preferably tapered to a smaller diameter from top to bottom (front to rear). The chain stay tubes 74,74 are identical and may be uniform or tapered depending on the strength and cosmetic requirements for the particular frame.

Prior to the final welding assembly step, a universally pivotable joint 118 or 120 is provided between the rear end of each seat stay tube 40 or chain stay tube 74, and a corresponding one of the offset peripheral portions 52 and 54 on the drop outs. Specifically, these universally pivotable joints are disclosed here as ball and socket joints as disclosed for the embodiments shown in FIGS. 1–13, but may take other forms as disclosed in FIGS. 14–16.

FIG. 11 shows the socket portion of the ball and socket joint at the rear end of each seat stay tube 40 or each chain stay tube 74. The end is spun or swaged inwardly to provide a reduced diameter tip with a thickened wall for strength and to provide a kerf to facilitate welding and a smooth joint after welding. End surface 78 is provided to fit against the ball surface 72 on the respective peripheral extensions 52 and 54. The surface 78 may be a concave spherical surface having a radius R to match the radius of the ball surface 72, or it may be conical and tangent to a sphere having the radius R, or it may be any other contour suitable to fit against the ball surface 72.

The yoke 42 has a pair of rearwardly and downwardly extending arms 80,80 with welded, pin and socket joints 82,82 connecting those arms to the top ends of the seat stay tubes 40,40. A third, welded pin and socket joint 90 connects the top of the yoke 42 to the bottom of the yoke tube 44. Each pin surface and socket joint 82 comprises a conical pin 86 at the bottom end of each yoke arm 80. This fits within a socket 88 formed at the upper end of each seat stay tube 40. This socket may be similar to that described in connection with FIG. 11, prior to the time it is fixed in place by welding as will be described.

In the bicycle frames shown in FIGS. 1 and 2, the sizes of the components of the seat stay subassembly 34 are the same for all frame sizes from 19" to 25", except for the yoke tube 44 which increases appropriately in length for each increase in frame size. (Note that the yoke tube 44 shown in FIG. 3 for the 25" frame is substantially longer than the yoke tube 44' shown in FIG. 4 for the 19" frame.)

The pin and socket joint 90 connecting yoke tube 44 with the yoke 42 is substantially the same as joints 82 except that the joint 90 is oval in cross section as shown in FIG. 5. The same is true of the joint 90' shown in FIG. 4 for the smaller frame. In each case (FIG. 3 or FIG. 4), the yoke tube 44 or 44' comprises an upper, round cross-section tubular portion 92 (or 92') connected to the back side of the seat tube 28 (or 28') by welding in the usual manner; and a lower, progressively flattened tubular section 94 (or 94') terminating in an oval socket 96 (or 96') sized to receive the upstanding oval pin section 98 (or 98') at the top of the yoke prior to fixation by welding.

The bicycle frame will be fabricated by first making the individual tubes and the drop outs shown and then welding them together while held temporarily in place by suitable clamps, jigs and fixtures. As an example, to hold the rear fork assembly components in place for the welding operation, a plurality of clamps are schematically shown in FIGS. 3 and 6. After the head, top, down and seat tubes are welded or brazed together in the conventional manner, either in sequence or all at the same time, these rear fork assembly components will be welded while clamped in positions to make the frame of the size desired. As shown in FIG. 3, the yoke tube 44 will be held by clamps 100,100; the yoke 42 will be held by clamps 102,102; each seat stay tube 40 will be held by clamps 104,104 and 106,106; and the drop outs 38, 38A will be held by clamps 108,108. Likewise, as shown in FIG. 6, each chain stay tube 74 will be held by clamps 110,110 and 112,112 while the drop outs are held by the above mentioned clamps 108,108.

While the components are so held, they will be welded at joints 114, 116, 118, and 120, the forward end portion 92 (or 92') of the yoke tube 44 will be welded to the seat tube 28 (or 28'), and the chain stay tubes 74,74 will be welded to the underside of the bottom bracket pedal housing 30.

It will be understood that the term "welding", is used here in the broad sense to include equivalent procedure such as brazing, fusing, soldering, etc.

Figure 7:
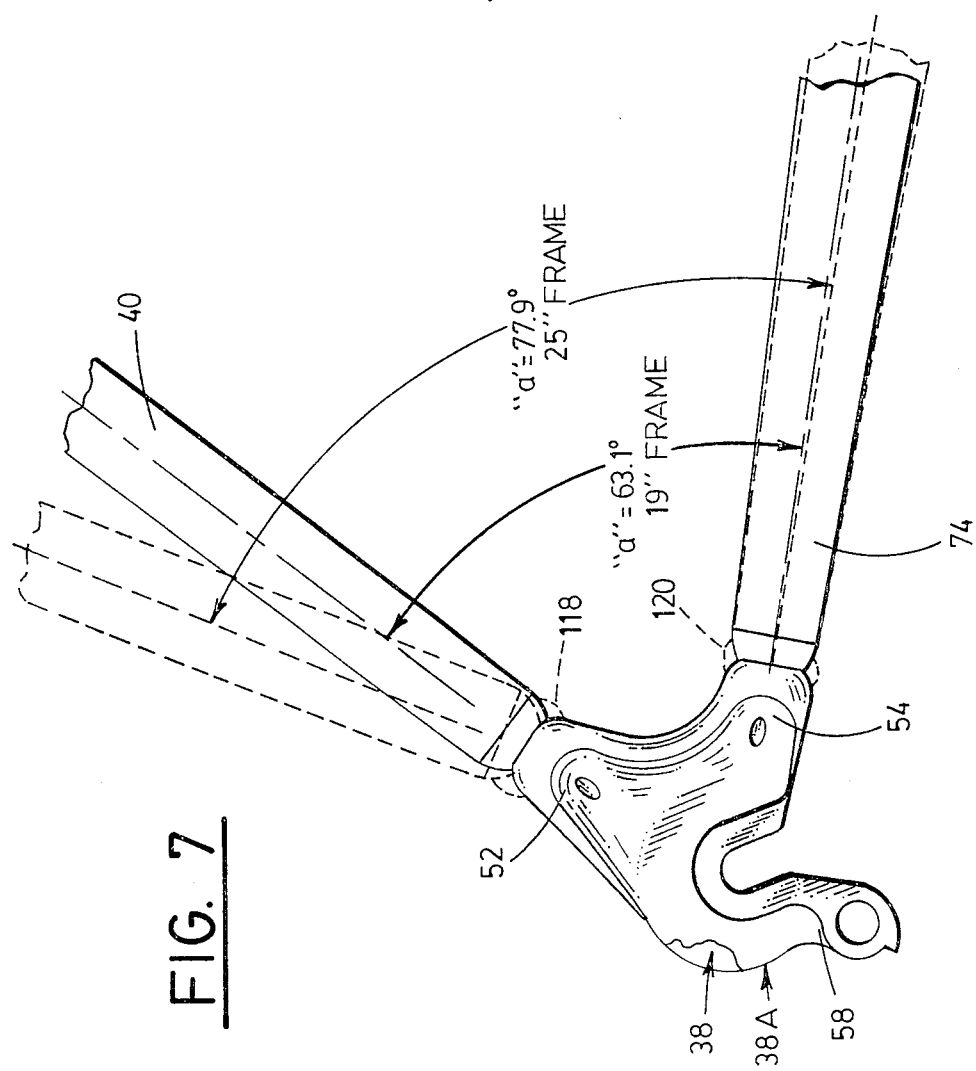
FIG. 7 shows, in broken lines and in solid lines respectively, fragmentary enlarged views of FIGS. 1 and 2 showing adaptability of the improved drop out to large and small frames with different angles between the seat stay tubes and the chain stay tubes.

Referring to FIG. 7, the seat stay tubes 40 will be welded to drop out peripheral portions 52 and the chain stay tubes 74 will be welded to drop out peripheral portions 54. Also, as shown in FIG. 7 a single set of drop outs 38, 38A may readily used for a 25" frame where the stay tubes are angularly spaced at 77.9°; or for a 19" frame where the stay tubes are angularly spaced at 63.1°; or for any other size frame intermediate those two.

Figure 8:
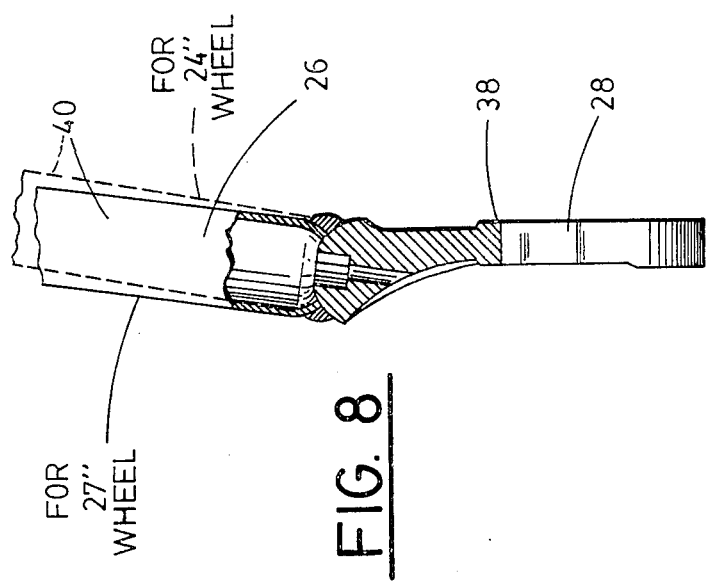
FIG. 8 is a fragmentary cross-sectional view of FIG. 2 taken partially on line 8—8 and showing adaptability of the improved drop out to different transverse angular relationships between the seat stay tubes, the same adaptability being applicable to the transverse angular relationships between the chain stay tubes.

As shown in FIG. 8, by reason of the transverse angular adjustability of the joints between the seat or chain stay tubes relative to the respective drop outs, the same drop out may be used even though the transverse angle varies for different size wheels. In FIG. 8 the seat stay tube 40 (or chain stay tube 74) is shown at different angles showing possible differences for bicycle frames made to accommodate a 24" or 27" wheel.

Thus, as illustrated in FIGS. 7 and 8, the present invention enables the seat stay tubes 40 and chain stay tubes 74 to be individually angularly adjustable, both longitudinally and transversely of the frame, before welding. This enables one set of components to fit many different size frames.

Referring now to the embodiment shown in FIGS. 12 and 13, this is similar to that shown in FIGS. 1–11 with the principal exception that the inverted U-shaped yoke 42 and the two seat stay tubes 40,40 separate from the yoke have been eliminated. Instead, a pair of unitary seat stay tubes 122,122 have been substituted. The forward end portions 122a,122a, are inwardly bent (FIG. 13) and welded directly to the lower end portion of the yoke tube at location 126. Thus, the seat post assembly shown in FIG. 13 is equivalent to the previously described seat post assembly 34 (or 34'), with fewer parts. Again, as described in connection with the previous embodiments, the only change needed in the seat stay subassembly shown in FIG. 13 to accommodate different size bicycle frames is to substitute the yoke tube 124 with one having a different length. In this respect, FIG. 12 shows two frame sizes, a small frame 128' shown in solid lines, and a larger frame 128 partially shown in broken lines. Note that the forward section 130 of the yoke tube for the larger frame is substantially longer than the forward section 130' of the yoke tube for the smaller frame. Otherwise the components of the frame shown in FIG. 12 are similar to those of the frames shown in FIGS. 1 and 2, and are designated by the same reference numerals.

Figure 14:
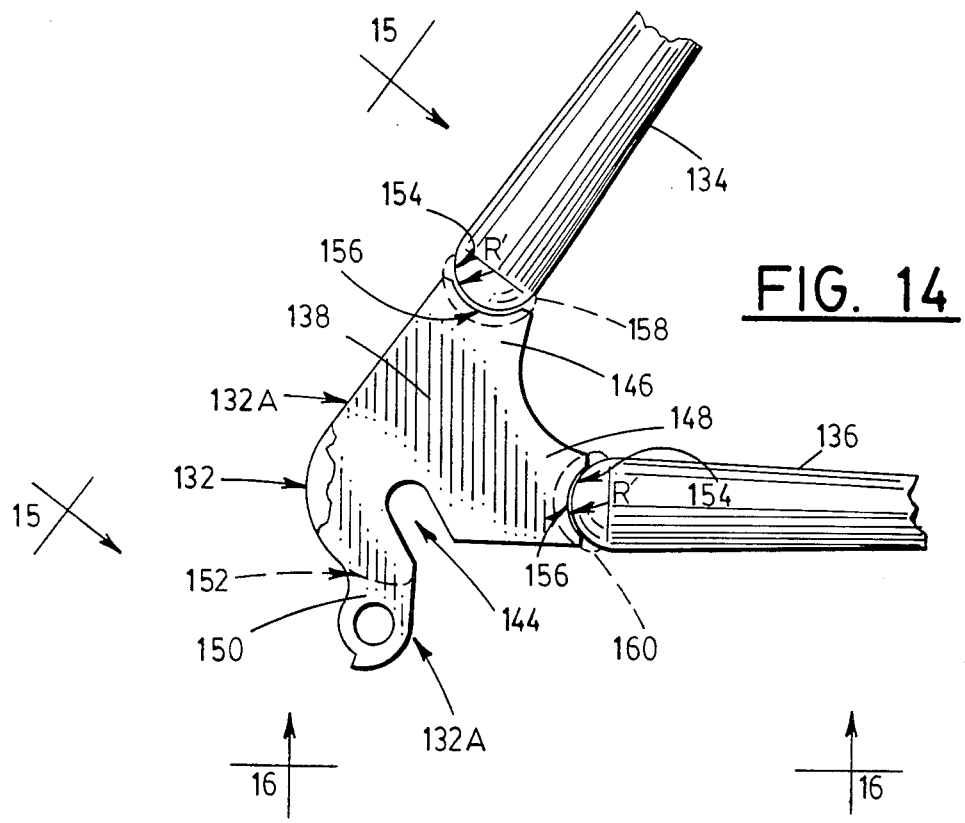
FIG. 14 is a fragmentary side view comparable to FIG. 7 showing an alternative form of drop out employing the present invention.
Figure 15:
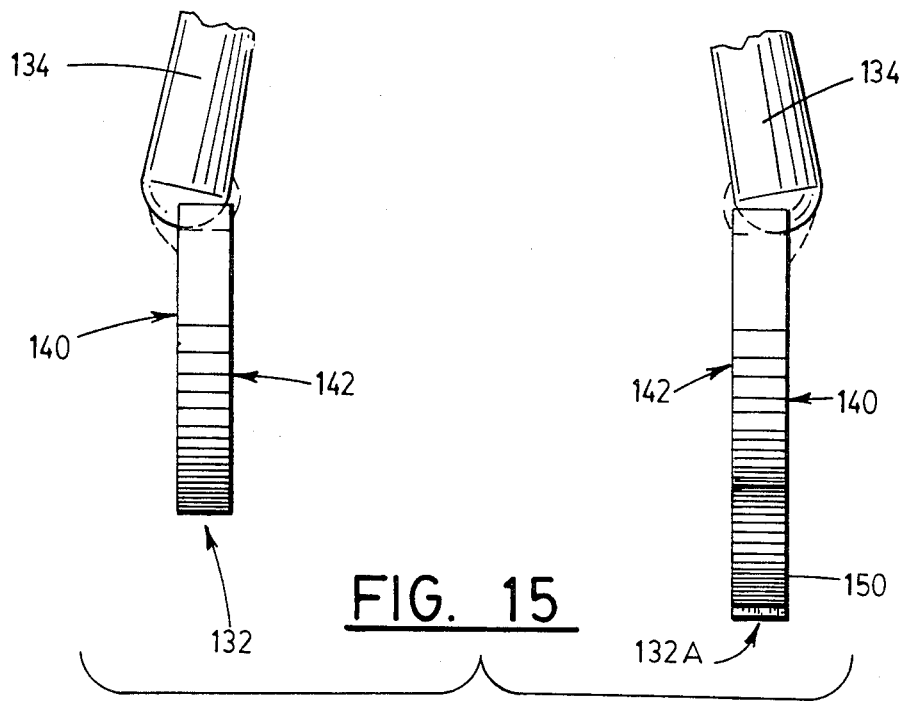
FIG. 15 is a rear view of FIG. 14, taken in the direction of arrows 15-15.

Referring now to the embodiment shown in FIGS. 14, 15, and 16, modified drop outs 132,132A are shown, having universally pivotable connections with the seat stay tubes 134 and chain stay tubes 136. Each drop out has a flat body 138, with opposite, parallel external surfaces 140, 142 and may be punched from a metal plate to provide an open-ended slot 144 to receive the end of a rear wheel axle. Each drop out has a pair of angularly-offset portions 146, 148 adapted to be connected by welding to a corresponding seat stay tube 134 and chain stay tube 136, respectively. The drop outs are identical except that the right hand drop out 132A has a mounting arm 150 for mounting a derailleur (not shown). For comparison, the left hand drop out 132 terminates along a broken line 152 in FIG. 14.

Each angularly offset portion 146 and 148 has an externally-concave curved portion 154 generated about a radius R' (FIG. 14). Each seat stay tube 134 and chain stay tube 136 has a ball surface 156 at the rear or lower end, having a complementary radius. In manufacture, the drop outs 132 and 132A and the seat stay tubes 134,134 and chain stay tubes 136,136 will be clamped in place as described above for the previous embodiment and welded at locations 158 and 160 indicated by broken lines in FIGS. 14, 15 and 16. One advantage of this embodiment is a cost saving over prior art constructions shown in FIG. 17. The drop outs 132, 132A may be produced cheaply by a simple punching operation and the ball-shaped rear end surfaces 156 on the stay tubes may be produced by a simple spinning or swaging operation.

The embodiments described and shown to illustrate the present invention have been necessarily specific for purposes of illustration. Alterations, extensions and modifications would be apparent to those skilled in the art. The aim of the appended claims, therefore, is to cover all variations included within the spirit and scope of the invention.

The embodiments of the invention in which an exclusive property or privilege is claimed are defined as follows:

1. In a method of fabricating a rear fork assembly for a bicycle frame, said frame comprising a head tube, top and down tubes extending rearwardly from the head tube, a seat tube connected between the top tube and a bottom bracket which is connected to the down tube, a rear fork assembly including a seat stay subassembly and a chain stay subassembly, said seat stay subassembly including a pair of seat stay tubes having connections at opposite ends to a pair of rear drop outs and to the top end of the seat tube, said chain stay subassembly including a pair of chain stay tubes having connections at opposite ends to the rear drop outs and the bottom bracket, the seat stay and chain stay tubes having a unique angular relationship for each different frame size, the steps of:
   (a) making said seat stay tubes and said drop outs as separate components with universally pivotable, abuttable joints between the rear ends of the seat stay tubes and mating portions of the drop outs, each said universally pivotable joint enabling relative angular adjustment of each seat tube and corresponding drop out in directions both longitudinal and transverse to the frame;
   (b) clamping said seat stay tubes and drop outs at a predetermined longitudinal and transverse angular relationship; and
   (c) welding said seat stay tubes to said drop outs at said joints while so clamped to fix said joints in said predetermined angular relationship;
   whereby a single size drop out may be used in making a plurality of sizes of bicycle frames by selectively varying said predetermined longitudinal and transverse angular relationship for each frame.

2. In a method of fabricating a rear fork assembly for a bicycle frame according to claim 1, the step of making said universally pivotable abuttable joints as ball and socket joints between the ends of the seat stay tubes and mating portions of the drop outs.

3. In a method of fabricating a rear fork assembly for a bicycle frame according to claim 2, the step of making said ball and socket joints with a ball portion on each drop out and a socket portion on the end of each corresponding seat stay tube.

4. In a method of fabricating a rear fork assembly for a bicycle frame according to claim 3, the step of making each socket portion as an annular-shaped surface at the end of the seat stay tube contoured to fit the corresponding ball-shaped surfaces on the drop outs.

5. In a method of fabricating a rear fork assembly for a bicycle frame according to claim 4, the step of making said annular-shaped surfaces spherically concave to fit the corresponding ball-shaped surfaces on the drop outs.

6. In a method of fabricating a rear fork assembly for a bicycle frame according to claim 1, the steps of:
   (a) selecting a generally cylindrical yoke tube of a predetermined length for a particular frame size;
   (b) bending the forward end portions of the seat stay tubes inwardly with end surfaces conformable to the generally cylindrical surface of the yoke tube;
   (c) welding said forward ends of the seat stay tubes to opposite generally cylindrical side surfaces of the portion of said yoke tube; and
   (d) welding a top portion of said yoke tube to a top portion of the seat tube;
   whereby the overall length of the seat stay assembly can be varied to meet the requirements of different frame sizes by selecting different predetermined lengths of yoke tubes.

7. In a method of fabricating a rear fork assembly for a bicycle frame according to claim 1, the additional steps of:
(d) making said chain stay tubes as separate components separate from said drop outs with universally pivotable, abuttable joints between the rear ends of the chain stay tubes and mating portions of the drop outs, each said universally pivotable joint enabling relative angular adjustment of each chain stay tube and corresponding drop out in directions both longitudinal and transverse to the frame;
(e) clamping said chain stay tubes and drop outs at a predetermined longitudinal and transverse angular relationship; and
(f) welding said chain stay tubes to said drop outs at said joints while so clamped to fix said joints in said predetermined angular relationship.

8. In a method of fabricating a rear fork assembly for a bicycle frame according to claim 7, the step of making said universally pivotable abuttable joints as ball and socket joints between the ends of the chain stay tubes and mating portions of the drop outs.

9. In a method of fabricating a rear fork assembly for a bicycle frame according to claim 8, the step of making said ball and socket joints with a ball portion on each drop out and a socket portion on the end of each corresponding chain stay tube.

10. In a method of fabricating a rear fork assembly for a bicycle frame according to claim 9, the step of making each socket portion as an annular-shaped surface at the end of the chain stay tube contoured to fit the corresponding ball-shaped surface on the drop out.

11. In a method of fabricating a rear fork assembly for a bicycle frame, said frame comprising a head tube, top and down tubes extending rearwardly from the head tube, a seat tube connected between the top tube and a bottom bracket which is connected to the down tube, a rear fork assembly including a seat stay subassembly and a chain stay subassembly, said seat stay subassembly including a pair of seat stay tubes having connections at opposite ends to a pair of rear drop outs and to the top end of the seat tube, said chain stay subassembly including a pair of chain stay tubes having connections at opposite ends to the rear drop outs and the bottom bracket, the seat stay and chain stay tubes having a unique angular relationship for each different frame size, the steps of:
(a) making said seat stay tubes and said drop outs as separate components with universally pivotable, abuttable joints between the rear ends of the seat stay tubes and mating portions of the drop outs;
(b) clamping said seat stay tubes and drop outs at a predetermined angular relationship;
(c) welding said seat stay tubes to said drop outs at said joints while so clamped to fix said joints in said predetermined angular relationship;
(d) making an inverted U-shaped yoke having a pair of downwardly extending arms, and making a yoke tube, both said yoke and yoke tube initially being separate components from the seat stay tubes and drop outs;
(e) providing articulated joints between each downwardly extending yoke arm and the top end of a corresponding seat stay tube;
(f) providing an articulated joint between the top end of the yoke and the bottom end of the yoke tube;
(g) clamping said articulated joints to hold said yoke tube, yoke and seat stay tubes in a predetermined angular relationship; and
(h) welding said yoke to said seat stays and to said yoke tube at said articulated joints while so clamped to fix said predetermined angular relationship therebetween;
whereby same-size yoke and seat stay tubes and drop outs may be used in making a plurality of sizes of bicycle frames while varying only the length of the yoke tube.

12. In a bicycle frame comprising head and seat tubes interconnected by top and down tubes, an improved rear fork assembly comprising:
a pair of seat stay tubes having means connecting their upper end portions to the seat tube and having their bottom end portions extending rearwardly and downwardly to a pair of transversely-spaced rear drop outs on opposite sides of the frame;
a pair of chain stay tubes having means connecting their forward end portions to the bottom end portions of the seat tube and down tube and having their rear end portions extending to said pair of rear drop outs;
each of said rear drop outs comprising a body having a rear-axle-receiving slot and a pair of angularly-offset peripheral portions extending respectively toward a seat stay tube and a chain stay tube on the same side of the frame;
said angularly-offset peripheral portions being connected to the respective seat stay and chain stay tubes by means of initially universally pivotable joints which are fixed in a predetermined angular relationship by welding, each said universally pivotable joint enabling relative angular adjustment of each seat tube and chain stay tube and corresponding drop out in directions both longitudinal and transverse to the frame.

13. In a bicycle frame, an improved rear fork assembly according to claim 12 in which said initially universally pivotable joints are of the ball and socket type.

14. A bicycle wheel drop out bracket comprising: a generally flat body having an open-ended drop out slot for a bicycle wheel axle; said body having a pair of angularly-offset peripheral portions adapted to be connected by welding to angularly-offset seat stay and chain stay tubes; each of said peripheral portions having an external ball-shaped surface adapted to be connected by welding to one of said tubes at different angular orientations.

15. A bicycle wheel drop out bracket comprising: a generally flat body having an open-ended drop out slot for a bicycle wheel axle; said body having a pair of angularly-offset peripheral portions adapted to be connected by welding to angularly-offset seat stay and chain stay tubes; each of said peripheral portions having an externally concave surface adapted to receive externally convex end surfaces on said stay tubes enabling each said peripheral portion to be connected by welding to one of said tubes at different angular orientations.

* * * * *

UNITED STATES PATENT AND TRADEMARK OFFICE
CERTIFICATE OF CORRECTION

PATENT NO. : 4,813,591

DATED : March 21, 1989

INVENTOR(S) : Clifford Mueller & George Herzovi

It is certified that error appears in the above-identified patent and that said Letters Patent is hereby corrected as shown below:

Column 5, line 14, after the second 74 insert -- ' --.

Column 5, line 60, delete -- surface --.

Column 5, line 61, after pin insert -- surface --.

Signed and Sealed this

Twenty-eighth Day of November 1989

Attest:

JEFFREY M. SAMUELS

Attesting Officer     Acting Commissioner of Patents and Trademarks